(12) United States Patent
Reid

(10) Patent No.: US 9,567,248 B2
(45) Date of Patent: Feb. 14, 2017

(54) ANAMMOX REACTOR STAGE IN A FLOW EQUALIZATION REACTOR PROCESS

(71) Applicant: John H. Reid, Fredericksburg, VA (US)

(72) Inventor: John H. Reid, Fredericksburg, VA (US)

( * ) Notice: Subject to any disclaimer, the term of this patent is extended or adjusted under 35 U.S.C. 154(b) by 156 days.

(21) Appl. No.: 14/593,508

(22) Filed: Jan. 9, 2015

(65) Prior Publication Data

US 2016/0200611 A1    Jul. 14, 2016

(51) Int. Cl.
   *C02F 3/30*   (2006.01)

(52) U.S. Cl.
   CPC ..................... *C02F 3/305* (2013.01)

(58) Field of Classification Search
   CPC ................... C02F 3/305; C02F 3/307
   USPC ............. 210/605, 621, 622, 623, 630, 903
   See application file for complete search history.

(56) References Cited

U.S. PATENT DOCUMENTS

| | | | | |
|---|---|---|---|---|
| 7,169,306 B1 * | 1/2007 | Porteous | ............... | C02F 3/12 210/620 |
| 7,722,768 B2 | 5/2010 | Abma et al. | | |
| 8,574,885 B2 | 11/2013 | Vanotti et al. | | |
| 2002/0074287 A1 * | 6/2002 | Park | ............... | C02F 3/302 210/605 |
| 2006/0086662 A1 * | 4/2006 | Ogden | ............... | C02F 3/32 210/620 |
| 2013/0126428 A1 * | 5/2013 | Jones | ............... | C02F 3/006 210/615 |
| 2013/0213883 A1 * | 8/2013 | Josse | ............... | C02F 3/302 210/630 |
| 2013/0327710 A1 | 12/2013 | Reid | | |
| 2014/0217019 A1 * | 8/2014 | Mehta | ............... | C02F 9/00 210/626 |
| 2014/0238931 A1 | 8/2014 | DiMassimo et al. | | |

* cited by examiner

*Primary Examiner* — Fred Prince
(74) *Attorney, Agent, or Firm* — Walter Ottesen, P.A.

(57) ABSTRACT

A flow equalization reactor for a multi-stage activated sludge process for treating industrial wastewater and/or municipal sewage is divided into two or more treatment zones. An outflow from a first treatment zone is mixed with an outflow from the second treatment zone in a mixer and conveyed to a third stage reactor containing anaerobic, autotrophic ammonia oxidizing anammox bacteria for converting nitrite nitrogen to nitrogen gas. The relative amounts of the outflows from the first and second treatment zones are controlled to promote and optimize the growth and accumulation of the anammox biomass in the third stage reactor.

22 Claims, 2 Drawing Sheets

ANAMMOX REACTOR STAGE IN A FLOW EQUALIZATION REACTOR PROCESS

FIELD OF THE DISCLOSURE

A flow equalization (EQ) reactor for a multi-stage activated sludge process for treating industrial wastewater and/or municipal sewage is disclosed in which the EQ reactor is divided into at least two treatment zones. An outflow from a first treatment zone is mixed with an outflow from the second treatment zone in a mixer and conveyed to a third stage reactor containing anaerobic, autotrophic ammonia oxidizing (anammox) bacteria for converting nitrite nitrogen and ammonia to nitrogen gas.

BACKGROUND

It is known from US2013/0327710 to mix the outflow of sequential treatment zones in an anaerobic lagoon or tank design to achieve improved carbon to nitrogen ratio control of the effluent. The anaerobic lagoon or tank produces a blended wastewater or sewage mixture with an adequately high carbon to nitrogen ratio for a downstream activated sludge treatment process to achieve enhanced nitrogen removal by nitrification-denitrification.

Bacteria mediating the direct conversion of nitrite and ammonium into nitrogen gas by the anaerobic ammonium oxidation (anammox) process are used for deammonification of wastewater without the intermediate production of nitrate. However, dissolved oxygen (DO) concentrations of more than 0.2 mg/L are known to inhibit the anammox process.

Significant challenges remain in the treatment of industrial wastewater or municipal sewage based on the variability of pollutant concentrations, volume, and temperature of the influent into a treatment facility.

SUMMARY OF THE DISCLOSURE

Disclosed herein is a process for operating a third stage anammox reactor in an activated sludge wastewater treatment with significantly reduced process requirements for oxygen transfer and supplemental carbon source chemical dosage.

In particular, a process is disclosed which comprises receiving a wastewater inflow or a sewage inflow in a flow equalization reactor; receiving an outflow $Q_2$ from the flow equalization reactor in a nitritation reactor; mixing a bypass flow $Q_1$ from the flow equalization reactor and an overflow from the nitritation reactor to obtain a mixed liquor flow; receiving the mixed liquor flow in a first stage clarifier; and receiving a first stage clarifier overflow in an anammox reactor.

BRIEF DESCRIPTION OF THE DRAWINGS

The disclosure will now be described with reference to the drawings wherein.

DESCRIPTION OF THE BEST AND VARIOUS EMBODIMENTS

Figure 1:
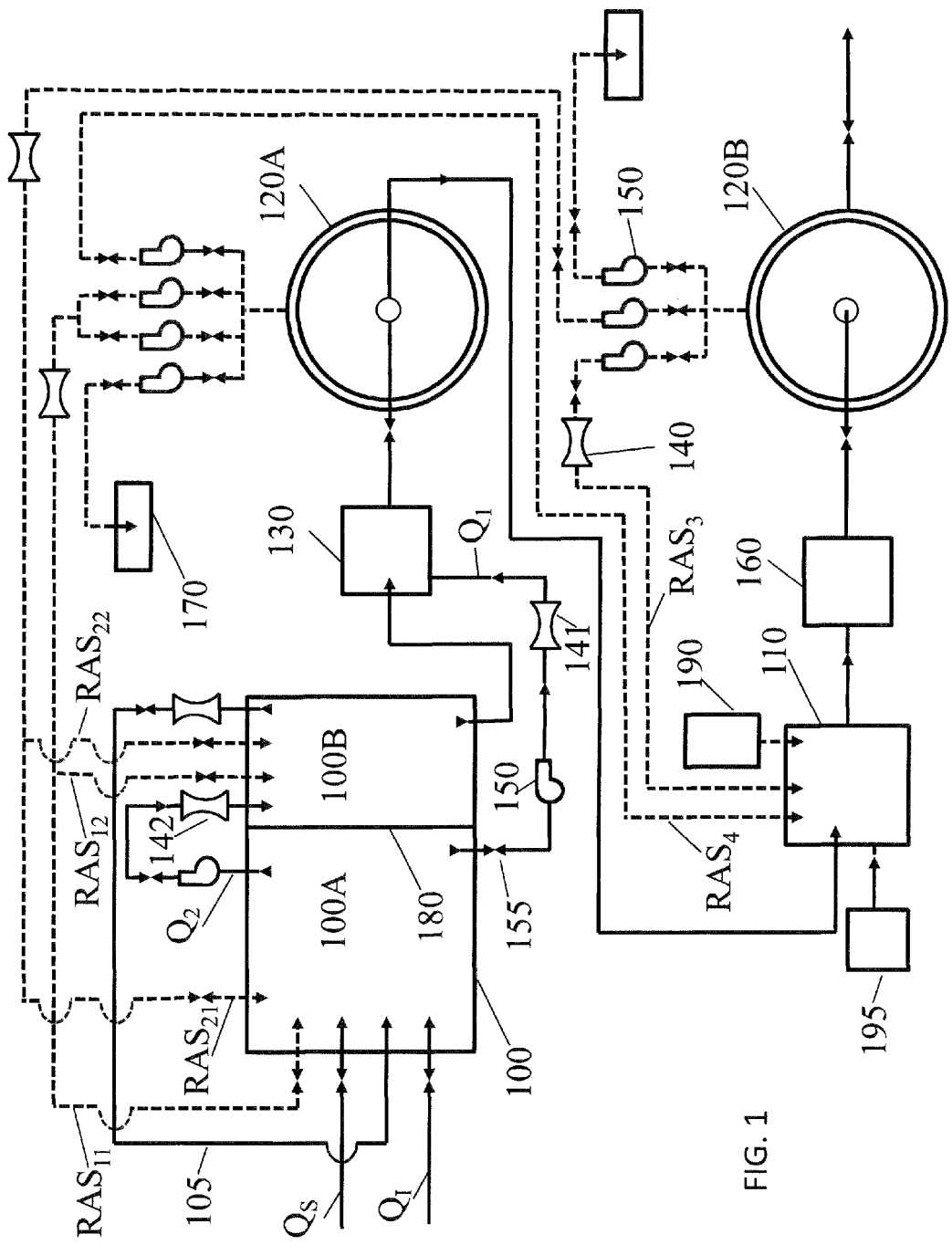
FIG. 1 shows a schematic overview of the treatment process in which a third stage anammox reactor 110 receives a mixture of a wastewater inflow from clarifier 120A; and, FIG. 2 shows a sideview of equalization reactor 100A with one or more treatment zones wherein a wastewater fill level within the reactor 100A is maintained between low level mark 210 and high level mark 220.

The foregoing and other objects, aspects, and advantages of the disclosure will be better understood from the following detailed description of the best and various embodiments. Throughout the various views and illustrative embodiments of the present disclosure, like reference numbers are used to designate like elements.

In a typical embodiment, the mixed liquor flow is treated in a first clarifier 120A before being received in the anammox reactor. In another typical embodiment, an outflow of the anammox reactor is treated in a second clarifier 120B. In yet another typical embodiment, a nitrite recycle flow 105 is conducted from the nitritation reactor into the flow equalization reactor.

In a particular embodiment, the wastewater inflow is a liquor selected from the group consisting of a digester supernatant, a sludge dewatering filtrate, an influent screened raw sewage, and a primary clarifier effluent, or a mixture thereof. In another particular embodiment, anammox biomass is recycled from the second clarifier 120B to the anammox reactor. In yet another particular embodiment, aerobic ammonium oxidizing biomass is recycled from the first clarifier 120A to at least one of the equalization reactor 100A and the nitritation reactor 100B.

With particularity, an average daily flow rate of the nitrite recycle flow is of from 100% to 1,000% of the average daily mixed liquor flow. Also with particularity, the average daily flow (ADF) rate of the nitrite recycle flow is 200% to 400% of the average daily throughput wastewater flow volume.

In a particular embodiment, the equalization reactor has an average total daily inflow rate, wherein an average daily flow rate of the mixed liquor bypass flow $Q_1$ is of from 50% to 60% of the average total inflow rate, and wherein an average daily flow rate of the wastewater flow $Q_2$ is of from 40% to 50% of the average total inflow rate. In another particular embodiment, the average daily flow rate of the mixed liquor bypass flow $Q_1$ is 55% of the average total inflow rate and the average daily flow rate of the wastewater flow $Q_2$ is 45% of the average total inflow rate. In yet another particular embodiment, the equalization reactor is operated with a dissolved oxygen concentration of approximately 0.0 mg/L.

In a typical embodiment, the aerobic ammonium oxidizing biomass is recycled from clarifier 120A in return activated sludge flow $RAS_{11}$ and/or $RAS_{12}$ with a flow rate of from 50% to 150% of the average daily throughput flow volume. In another typical embodiment, a combined sludge retention time of biomass sludge in the equalization reactor plus nitritation reactor is selected to be approximately 1 to 4 days, more typically about 3 days. In yet another typical embodiment, a sludge retention time of biomass sludge in the anammox reactor is selected to be of from 40 to 60 days, more typically about 50 days.

With particularity, the nitritation reactor is operated with a dissolved oxygen concentration of approximately 0.10 to 0.40 mg/L, more particularly 0.20 mg/L. Also with particularity, the anammox reactor is operated with a dissolved oxygen concentration of from 0.0 mg/L to approximately 0.10 mg/L.

A hypochlorite solution or a hydrogen peroxide solution can be optionally added to the nitritation reactor to inhibit the growth of nitrite oxidizing bacteria. Also, surface aeration can be optionally used in the nitritation reactor to reduce the mixed liquor temperature in order to inhibit the growth of nitrite oxidizing bacteria.

Turning to the drawings, FIG. 1 shows a wastewater treatment system 100, which is divided into two treatment zones 100A and 100B by separator wall 180. The first treatment zone is operated as a flow equalization reactor (EQ reactor) to equalize diurnal flow variations, stormwater flow surges, and spikes in the influent wastewater flow; to mix and blend various influent wastewater sources such as screened and degritted raw sewage $Q_1$, high strength sludge digester process supernatant wastewater $Q_s$, and/or sludge dewatering process filtrate wastewater and filter backwash wastewater. Further, the first treatment zone 100A provides a first stage activated sludge treatment for carbonaceous biological oxygen demand (BOD) removal by anoxic heterotrophic biomass (AHB) using nitrite or nitrate nitrogen contained in mixed liquor of nitrite recycle flow (NiR) 105 recycled from the downstream second stage aerobic nitritation reactor 100B as an oxygen source.

From the equalization reactor 100A, mixed liquor containing partially treated wastewater or sewage flows through valve 155 and is pumped with pump 150 as by-pass flow $Q_1$ to flocculation tank 130, which is operated as a mixer cell. Further, a second flow of partially treated wastewater or sewage $Q_2$ is pumped directly to the nitritation reactor 100B. The flow rates $Q_1$ and $Q_2$ are measured using flow meters 141 and 142, respectively. An overflow of mixed liquor from the nitritation reactor is also received in the flocculation tank 130, which combines and mixes the by-pass mixed liquor flow from the equalization reactor and the mixed liquor overflow from the nitritation reactor. After mixed liquor suspended solids are settled in first clarifier 120A, the clarifier overflow is conducted to anammox reactor 110 for treatment by anammox bacteria. Optionally, two or more clarifiers 120A may be operated in parallel.

From first clarifier 120A one or more return activated sludge (RAS) flows may be provided. In particular, $RAS_{11}$ line returns activated sludge to the equalization reactor 100A and $RAS_{12}$ returns activated sludge to the nitritation reactor 100B. Further, activated sludge can be pumped from the first clarifier 120A through line $RAS_4$ to the anammox reactor 110 and a return activated sludge flow can be provided from second clarifier 120B to anammox reactor 110 using return activated sludge line $RAS_3$. In addition, return activated sludge line $RAS_{21}$ is provided for returning activated sludge from second clarifier 120B to equalization reactor 100A and $RAS_{22}$ is provided for returning activated sludge from second clarifier 120B to nitritation reactor 100B. The flow rate is measured using flow meter 140.

A mixed liquor outflow from anammox reactor 110 is conducted to flocculation tank 160 and subsequently into second clarifier 120B. Optionally, two or more clarifiers 120B may be operated in parallel.

Excess sludge can be collected and discarded using waste activated sludge tank 170. Optionally, a carbon source from carbon source container 190 may be added to anammox reactor 110 to assist in removal of any nitrate nitrogen that might be present in the clarifier 120B overflow wastewater. Typical carbon source solutions are, for example, methanol, high quality waste glycerin, sugar-based waste products, and acetic acid or a mixture thereof.

Annamox reactor 110 can optionally be maintained at a temperature between 20° C. and 30° C. by providing heat using heat source 195. The heat source can be a steam injector, one or more dry heating elements, or a heat exchanger unit through which a mixed liquor flow is recirculated.

The equalization reactor 100A is operated at approximately 0.0 (zero) dissolved oxygen (DO) concentration with nitrite recycle influent flow, and, with or without return activated sludge (RAS) influent flow. A continuous mixed liquor recycle flow rate of 100% to 1000% (400% average) designated as the nitrite recycle (NiR) Flow Rate 105 is provided from the nitritation reactor 100B back into the equalization reactor 100A. An RAS rate of 50% to 150% is typically used from the downstream clarifier for the RAS flows $RAS_{11}$ and $RAS_{12}$ to the equalization reactor and/or the nitritation reactor.

Figure 2:
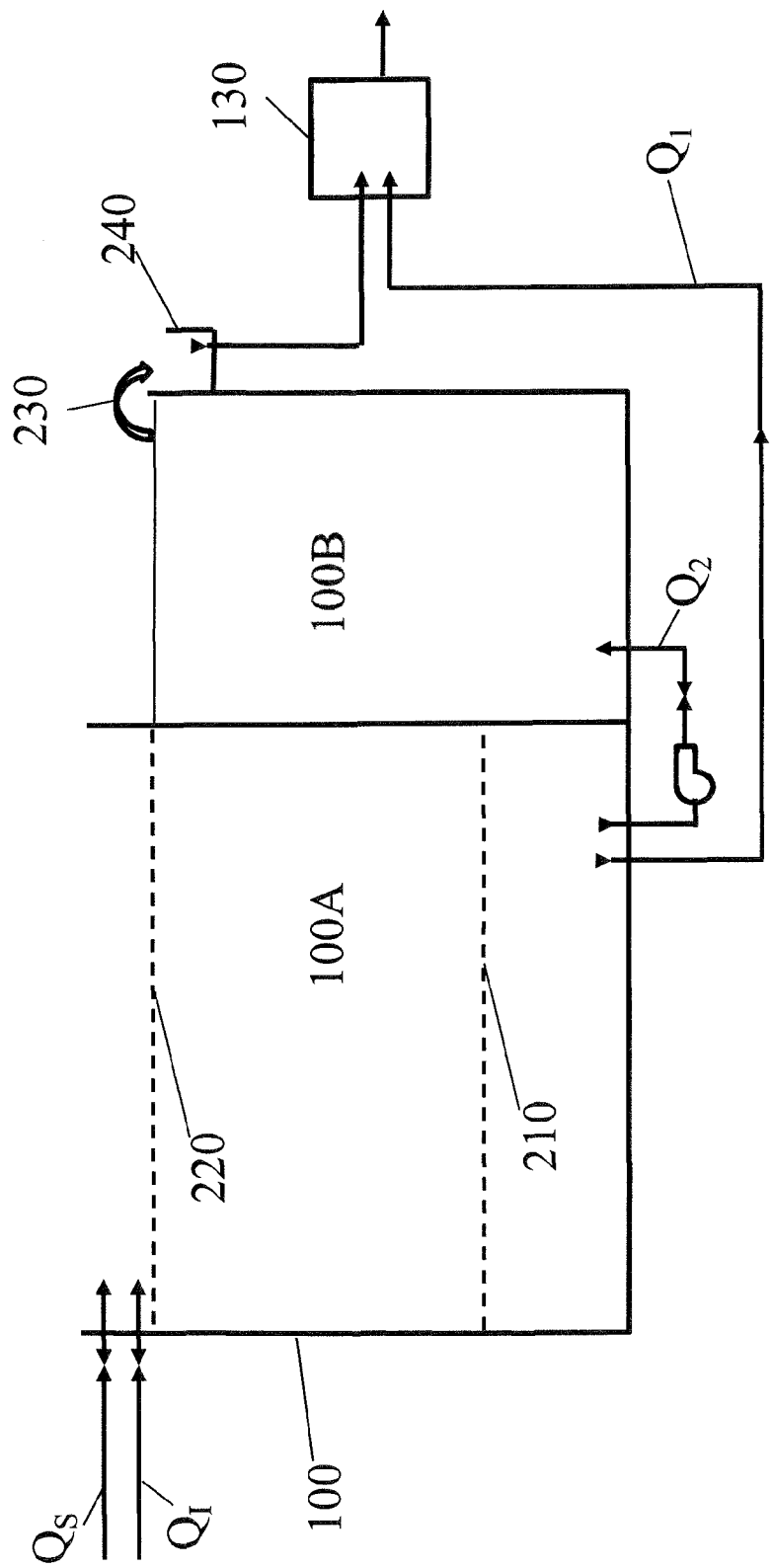

FIG. 2 shows a side view of wastewater treatment system 100. The combined inflow into the equalization reactor 100A is equalized such that a fill height of wastewater or sewage in the reactor is maintained between low level mark 210 and high level mark 220 where the inflow undergoes partial treatment. After the partial treatment, an outflow $Q_2$ is received in nitritation reactor 100B. The flow rates of flows $Q_1$ and $Q_2$ leaving the equalization reactor can be constant or substantially constant. An overflow 230 is collected in trough 240. Mixed liquor overflow 230 and mixed liquor by-pass flow $Q_1$ are mixed in flocculation tank 130 before being conducted to clarifier 120A for biomass sedimentation.

Uniquely to the system and method disclosed herein, the equalization reactor 100A is also operated to accurately divide the partially treated reactor effluent mixed liquor into a first flow portion $Q_2$, which is pumped constantly into the downstream second stage aerobic nitritation reactor, and a second flow portion $Q_1$, which by-passes the second stage aerobic reactor, and, is pumped constantly into a first stage clarifier 120A. A first portion flow rate $Q_2$ of approximately 40% to 50%, in particular 45%, of the total average daily influent wastewater flow volume or flow rate of sewage or wastewater plus sludge treatment supernatant and filtrate, plus the RAS flow rate, plus the nitrite recycle flow rate is constantly pumped from the EQ reactor into the downstream second stage aerobic nitritation reactor 100B for treatment by anammox bacteria. A second portion flow rate $Q_1$ of approximately 50% to 60%, in particular 55%, of the total average daily influent wastewater flow volume plus recycle flow is pumped from the equalization reactor directly into the first stage clarifier influent mixed liquor flow, thereby by-passing the second stage aerobic nitritation reactor 100B.

Using this equalization reactor effluent flow splitting process, the clarified and partially treated influent wastewater that flows into the third stage reactor 110 is a mixture of an approximately 45% first portion wastewater flow with reduced ammonia concentration, increased nitrite nitrogen concentration, low nitrate nitrogen concentration, and further reduced carbonaceous BOD concentration; and, an approximately 55% second portion wastewater flow portion with high influent ammonia concentration, low nitrite and nitrate concentration, and reduced carbonaceous BOD concentration.

The first stage clarifier effluent is a blend of partially treated wastewater that has a low BOD concentration, increased nitrite nitrogen concentration, and reduced ammonia nitrogen concentration. The BOD, ammonia nitrogen, and nitrite nitrogen concentrations in the first stage clarifier effluent are controlled by the operation of the equalization reactor process flow splitting method plus nitrite recycle flow 105 from the downstream nitritation reactor back into the equalization reactor 100A. The concentrations of BOD, ammonia nitrogen, and nitrite nitrogen in the blended first stage clarifier effluent are controlled to promote and optimize the growth and accumulation of anaerobic, autotrophic ammonia oxidizing anammox biomass in the third stage anammox reactor 110 in which these autotrophic bacteria will use nitrite nitrogen as an inorganic food substrate to convert nitrite nitrogen to nitrogen gas. In a particular embodiment, the process is conducted without supplemental carbon source dosage 190.

In the three stage activated sludge process with intermediate (first stage) and final (second stage) clarification steps, the first stage equalization reactor is typically operated at zero dissolved oxygen (DO) concentration; the second stage aerobic reactor at low DO concentration of approximately 0.20 mg/L; and the third stage anammox reactor at low DO concentration of 0.0 to 0.20 mg/L. Biomass solids that are produced in the first and second stage reactors are settled in the first stage clarifier(s) and recycled by pumping back into the first stage equalization reactor or optionally into the second stage aerobic nitritation reactor 100B. Biomass solids that are produced in the third stage reactor 110 are settled in the second stage clarifier 120B and recycled by pumping the solids back into the third stage reactor. Thereby, separate biomass sludges each having a different and independent Sludge Retention Time (SRT) and mean cell residence time (MCRT) can be produced and maintained in the first and second stage reactor-clarifier system vs. the third stage reactor-clarifier system.

Maintaining independent SRT and MCRT control in the first and second stage reactor-clarifier system, and, the third stage reactor-clarifier system allows for producing, maintaining, and controlling the growth and population of anaerobic autotrophic ammonia oxidizing anammox bacteria, which accomplish the deammonification process in the third stage anammox reactor 110. The deammonification process involves two process steps including the nitritation of ammonia by aerobic AOB in the first and second stage reactor-clarifier system followed by the anaerobic oxidation of residual ammonia to nitrogen gas by anaerobic AOB in the third stage reactor-clarifier system.

Specifically, the two process steps can be represented by the following reaction equations:

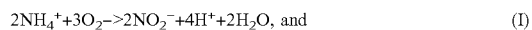

$$2NH_4^+ + 3O_2 \rightarrow 2NO_2^- + 4H^+ + 2H_2O, \text{ and} \quad (I)$$

$$NH_4^+ + NO_2^- \rightarrow N_2 + 2H_2O. \quad (II)$$

This deammonification process significantly reduces the operating costs for oxygen transfer power and for supplemental carbon source chemical dosage required to achieve total nitrogen removal.

Short SRT and MCRT times of about 1 to 4 days, in particular approximately 3 days, are preferred for the growth of anoxic heterotrophic biomass (AHB) and aerobic ammonia oxidizing bacteria (AOB) to achieve BOD removal and nitritation in the first and second stage reactor-clarifier system, while much longer SRT and MCRT times about 40 to 60 days, in particular approximately 50 days, are preferred for the growth of anaerobic, anammox AOB to achieve nitrite and ammonia removal in the third stage reactor-clarifier system.

An average nitrite recycle (NiR) flow rate 105 of 200% to 400% of the average daily flow (ADF) is provided from nitritation reactor 100B back into equalization reactor 100A, which removes approximately 80% of any nitrate nitrogen unintentionally produced in nitritation reactor 100B via denitrification by AHB in flow equalization reactor 100A. The NiR also recycles approximately 80% of the nitrite nitrogen intentionally produced in nitritation reactor 100B, which is also removed via denitrification by AHB in equalization reactor 100A and thereby assists in preventing nitrite accumulation in nitritation reactor 100B because nitrite is a toxic compound when present in excess.

An optional sludge recycle line ($RAS_4$) can be supplied for clarifier 120A to provide the capability of very accurately controlling the feed rate of AHB, which is contained in clarifier 120A mixed liquor underflow, into the anammox reactor 110 influent flow. Thereby, additional nitrite or nitrate nitrogen removal by denitrification in anammox reactor 110 is made possible. In particular, the $RAS_4$ flow into anammox reactor 110 can be used to achieve additional denitrification by AHB in anammox reactor 110, if desired for the total nitrite or nitrate removal, without over-populating the mixed liquor maintained in anammox reactor 110 with AHB and causing AHB to outcompete the anammox organisms.

Surface aeration can be optionally used in nitritation reactor 100B to reduce the mixed liquor temperature and thereby repress nitrite oxidizing biomass (NOB) in the nitritation reactor. An appropriate chemical solution, such as hypochlorite solution, hydrogen peroxide, or peracetic acid can be optionally dosed into nitritation reactor 100B to inhibit the growth and accumulation of nitrite oxidizing biomass (NOB) and the production of nitrate nitrogen in the first and second stage reactor-clarifier system.

The disclosed process uses a flow equalization reactor in a multi-stage activated sludge process in which an anammox biomass population is maintained in a third stage reactor-clarifier system to achieve biological nitrogen removal with significantly reduced process requirements for oxygen transfer and supplemental carbon source chemical dosage.

The embodiments described hereinabove are further intended to explain best modes known of practicing the disclosure and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. A process for treating wastewater or sewage comprising:
   receiving a wastewater inflow or a sewage inflow in a flow equalization reactor;
   receiving an outflow $Q_2$ from the flow equalization reactor in a nitritation reactor;
   mixing a bypass flow $Q_1$ from the flow equalization reactor and an overflow from the nitritation reactor to obtain a mixed liquor flow;

receiving the mixed liquor flow in a clarifier; and,
receiving a clarifier overflow in an anammox reactor.

2. The process according to claim 1, further comprising:
treating the mixed liquor flow in a first clarifier before the mixed liquor flow is received in the anammox reactor.

3. The process according to claim 1, further comprising:
treating an outflow of the anammox reactor in a second clarifier.

4. The process according to claim 1, further comprising:
conducting a nitrite recycle flow from the nitritation reactor into the flow equalization reactor.

5. The process according to claim 1, wherein the wastewater inflow or sewage inflow is a liquor selected from the group consisting of a digester supernatant, a sludge dewatering filtrate, an influent screened raw sewage, and a primary clarifier effluent, or a mixture thereof.

6. The process according to claim 3, further comprising:
recycling anammox biomass from the second clarifier to the anammox reactor.

7. The process according to claim 2, further comprising:
recycling aerobic ammonium oxidizing biomass from the first clarifier to at least one of the equalization reactor and the nitritation reactor.

8. The process according to claim 4, wherein an average daily flow rate of the nitrite recycle flow is of from 100% to 1,000% of the average daily mixed liquor flow.

9. The process according to claim 8, wherein the average daily flow rate of the nitrite recycle flow is 200% to 400% of the average daily throughput wastewater flow volume.

10. The process according to claim 1, further comprising:
adding a carbon source solution to the anammox reactor.

11. The process according to claim 10, wherein the carbon source solution is selected from the group consisting of methanol, glycerin, sugar-based waste product, and acetic acid, or a mixture thereof.

12. The process according to claim 1,
wherein the equalization reactor has an average total daily inflow rate;
wherein an average daily flow rate of the bypass flow $Q_1$ is of from 50% to 60% of the average total inflow rate; and,
wherein an average daily flow rate of the wastewater flow $Q_2$ is of from 40% to 50% of the average total inflow rate.

13. The process according to claim 12,
wherein the average daily flow rate of the bypass flow $Q_1$ is 55% of the average total inflow rate; and,
wherein the average daily flow rate of the wastewater flow $Q_2$ is 45% of the average total inflow rate.

14. The process according to claim 1, further comprising:
operating the equalization reactor with a dissolved oxygen concentration of approximately 0.0 mg/L to 0.30 mg/L.

15. The process according to claim 7, wherein the aerobic ammonium oxidizing biomass is recycled with a flow rate of from 50% to 150% of the average daily mixed liquor flow.

16. The process according to claim 1, further comprising:
selecting a sludge retention time of biomass sludge in the equalization reactor and the nitritation reactor to be of from 1 to 4 days.

17. The process according to claim 1, further comprising:
selecting a sludge retention time of biomass sludge retained in the anammox reactor plus the nitritation reactor to be of from 40 to 60 days.

18. The process according to claim 1, further comprising:
operating the nitritation reactor with a dissolved oxygen concentration of from 0.10 mg/L to 0.40 mg/L.

19. The process according to claim 1, further comprising:
operating the anammox reactor with a dissolved oxygen concentration of from 0.0 mg/L to approximately 0.10 mg/L.

20. The process according to claim 1, further comprising:
adding a hypochlorite solution or a hydrogen peroxide solution or a peracetic acid solution to the nitritation reactor.

21. The process according to claim 1, further comprising:
performing a surface aeration of the nitritation reactor.

22. The process according to claim 1, further comprising:
adding heat to the anammox reactor to maintain a mixed liquor temperature in the anammox reactor between 20° C. and 30° C. by injecting steam into the anammox reactor, by providing heating elements in the anammox reactor, or, by recirculating a mixed liquor flow through a heat exchanger unit.

* * * * *